Patented Jan. 23, 1945

2,368,068

UNITED STATES PATENT OFFICE 2,368,068

DIMERS OF 2-METHYL-PENTADIENE AND PROCESS FOR PREPARING SAME

Glen H. Morey, Terre Haute, Ind., assignor to Commercial Solvents Corporation, Terre Haute, Ind., a corporation of Maryland No Drawing. Application January 28, 1942, Serial No. 428,576

3 Claims. (Cl. 260—682)

The present invention relates to a new and useful composition of matter. More particularly, it relates to the dimeric form of 2-methylpentadiene, and to a process for producing the latter from 2-methyl-2,4-pentanediol.

It is well known in the art that numerous monohydric and polyhydric alcohols may be dehydrated to yield respectively the corresponding olefines or polyolefines by treating said monohydric or polyhydric alcohols with certain of the mineral acids. In all of such instances, however, so far as I am aware, the monomeric form of the olefine is produced, together, in certain instances, with varying quantities of the product resulting from the addition of the elements of the mineral acid to the resulting olefine. Thus, for example, upon treating tertiary butyl alcohol with concentrated hydrochloric acid, isobutylene is presumably formed, a substantial proportion of which subsequently adds on the elements of hydrochloric acid to form tertiary butyl chloride. The resulting mixture is found to consist essentially of tertiary butyl chloride and varying amounts of isobutylene, depending upon the conditions under which the reaction was effected. There is no evidence of extensive polymerization of said isobutylene occurring, and never under such conditions, to my knowledge, has there ever been detected the dimer of isobutylene (diisobutylene) in the slightest trace, when hydrochloric acid is used. It is necessary to use polymerization catalysts to polymerize isobutylene.

Contrary to what one versed in the art would normally expect, in view of the above facts, I have found that by contacting 2-methyl-2,4-pentanediol with a suitable mineral acid, such as, for example, hydrochloric, sulfuric, or hydrobromic acids, at temperatures ranging from approximately —10° C. to about 100° C., depending on the method selected, appreciable quantities of the dimeric form of the corresponding diolefine (2-methyl-pentadiene) are produced, together with 2 - methyl-pentene - 2 - ol - 4, and a small amount of a more highly polymerized substance. The product which I obtain may be prepared either by heating a mixture of the 2-methyl-2,4-pentanediol and a mineral acid to reflux temperature and distilling, or permitting said mixture to stand at a lower temperature, preferably room temperature, for a period of from 5 to 6 hours. It will be evident, from an inspection of the structural formula of 2-methyl-pentadiene, that the dimer produced therefrom is, theoretically, at least, capable of existing in several isomeric forms, and it is believed that the product which I have produced constitutes such a mixture of isomers.

The process by which the dimers of the present invention may be prepared is subject to numerous variations. The quantity of mineral acid employed will vary with the method utilized in preparing the above-mentioned mixture of dimers. For example, if it is desired to obtain said dimers within a short period of time, a solution consisting of 2-methyl-2,4-pentanediol and from about 2 to 5 per cent by volume of the mineral acid is heated to refluxing temperature and distilled, the dimer being produced approximately as rapidly as the distillation proceeds. Improved yields of the dimers of 2-methyl-pentadiene may be obtained by reacting substantially equal parts by volume of 2-methyl-2,4-pentanediol and the mineral acid at room temperature, i. e., 25–30° C., and permitting the resulting mixture to stand for a period of from 5 to 6 hours. The mineral acid is completely soluble in 2-methyl-2,4-pentanediol, and consequently upon mixing these two materials, a clear solution results. However, under ordinary conditions the reaction mixture, upon standing, becomes progressively turbid, the product separating as a milky white oil and constituting the upper layer; whereas the water produced by the dehydration reaction, together with the unreacted 2-methyl-2,4-pentanediol, comprise the lower layer. At the conclusion of the reaction, however, the lower layer consists principally of water, the major portion of 2-methyl-2,4-pentanediol having been dehydrated upon contact with the mineral acid. The upper oil layer may then be separated by any convenient means, and the dimers obtained upon fractionation.

The examples which follow are illustrative of certain modifications of my novel process.

Example I

A solution consisting of 2500 parts of 2-methyl-2,4-pentanediol and 75 parts of concentrated hydrochloric acid, was heated to refluxing temperature and then carefully fractionated. The distillate thus obtained separated into two layers, the upper layer of which contained the crude mixture of dimers of 2-methylpentadiene, together with a small amount of 2-methylpentadiene and some 2-methylpentene-2-ol-4. This upper layer was separated and fractionally distilled under reduced pressure, and the portion boiling at 109° C. (50 mm.) collected separately. The quantity of 2-methylpentadiene dimer obtained at this temperature, amounted to a yield of 35 per cent based upon the 2-methyl-2,4-pentanediol.

Example II

A solution consisting of 2000 parts of 2-methyl-2,4-pentanediol and 2000 parts of concentrated sulfuric acid was permitted to stand for 5 hours. At the conclusion of this period the oily upper layer was separated and fractionated as described in Example I. The quantity of 2-methylpentadiene dimer, produced in this manner, corresponded to a yield of 55 per cent based upon the 2-methyl-2,4-pentanediol.

The following data were determined on the product produced as described above: boiling point, 109° C.-112° C. (50 mm.); molecular weight, found 168, theory 164; bromine absorption, found 2.5 grams/gram, theory 2.9 grams/gram; carbon analysis, found 86.31, theory 87.8.

It is to be understood that while the properties listed immediately above will be useful in identifying the product of the present invention, I do not desire to be restricted solely to a material having the exact properties listed, since the number of preparations from which the above data were determined, was limited.

The product of the present invention has been found to be useful in the preparation of various coating compositions, particularly where special solvent properties are desired. Other uses of this material will be apparent to those skilled in the art.

My invention now having been described, what I claim is:

1. A process for the preparation of dimers of 2-methylpentadiene, which comprises contacting 2-methyl-2,4-pentanediol with from about 2 to 50 per cent by volume of a mineral acid selected from the group consisting of hydrochloric, sulfuric, and hydrobromic acids.

2. A process for the preparation of dimers of 2-methylpentadiene, which comprises distilling 2-methyl-2,4-pentanediol in the presence of approximately 2 to 5 per cent by volume of a mineral acid selected from the gorup consisting of hydrochloric, sulfuric, and hydrobromic acids.

3. A process for the preparation of dimers of 2-methylpentadiene, which comprises contacting approximately equal volumes of 2-methyl-2,4-pentanediol and a mineral acid selected from the group consisting of hydrochloric, sulfuric, and hydrobromic acids.

GLEN H. MOREY.